United States Patent Office 2,973,646
Patented Mar. 7, 1961

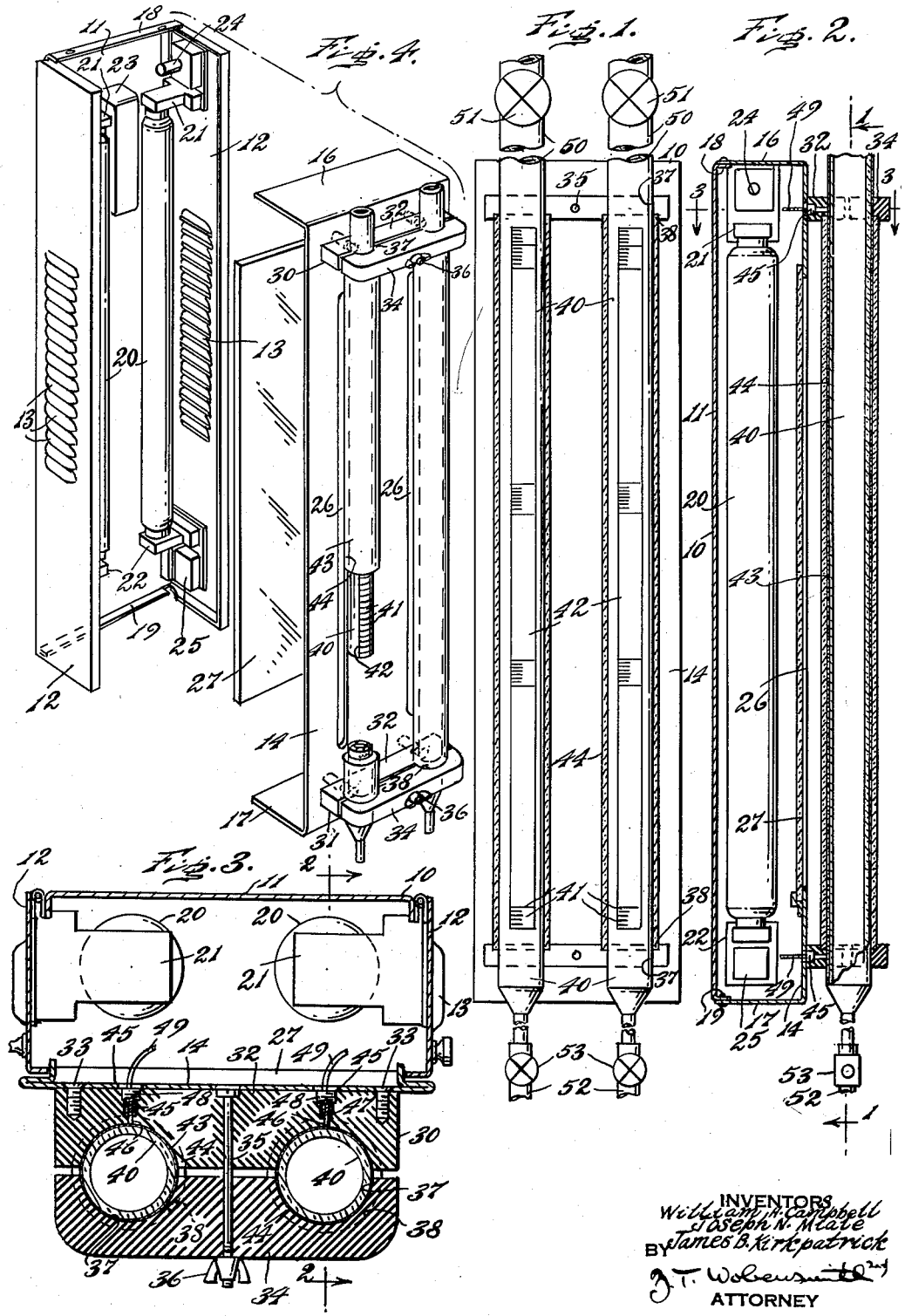

2,973,646

HEATED MEASURING TUBE

William H. Campbell, Pitman, Joseph N. Miale, Runnemede, and James B. Kirkpatrick, Mullica Hill, N.J. (all % Pressure Products Industries, Inc., Hatboro, Pa.)

Filed Dec. 20, 1957, Ser. No. 704,172

3 Claims. (Cl. 73—427)

This invention relates to measuring instruments, and more particularly to such instruments for the measurement of volume, level or rate of flow of fluids and particularly fluids which are of high viscosity or even solid at ordinary room temperature.

Conventional methods for measuring these materials are beset with many problems. Charge stock containers are wrapped with various types of heaters which obscure vision, preventing accurate volumetric measurement of the contents. Container walls thus heated are also subjected to hot or cold spots depending on the spacing of the heater elements.

It is the principal object of the present invention to provide a measuring instrument having a transparent glass tube for containing or retaining the material to be measured and in which provisions are made for directly heating the tube and the materials within the tube to maintain the proper physical conditions therein.

It is a further object of the present invention to provide measuring apparatus of the character aforesaid in which the measuring tube is electrically insulated and physically protected.

It is a further object of the present invention to provide a transparent heated measuring tube for fluids having illuminating structure to aid in determining the proper measurement of the fluid within the tube.

It is a further object of the present invention to provide a transparent measuring tube having improved provisions for heating the same without obscuring the vision of the observer and in a simple and compact manner.

It is a further object of the present invention to provide a transparent electrically heated measuring tube for fluids in which the heating structure is of such character that the pressure and temperature of the fluid can be readily controlled.

Other objects and advantageous features of the invention will be apparent from the description and claims.

The nature and characteristic features of the invention will be more readily understood from the following description, taken in connection with the accompanying drawings forming part thereof, in which:

Figure 1 is a vertical sectional view of a measuring instrument in accordance with the invention, taken approximately on the line 1—1 of Fig. 2;

Fig. 2 is a vertical sectional view taken approximately on the line 2—2 of Fig. 3;

Fig. 3 is a horizontal sectional view, enlarged, taken approximately on the line 3—3 of Fig. 2; and Fig. 4 is an exploded perspective view of the measuring instrument shown in Figs. 1 to 3, inclusive.

It should, of course, be understood that the description and drawings herein are illustrative merely, and that various modifications and changes can be made in the structure disclosed without departing from the spirit of the invention.

Like numerals refer to like parts throughout the several views.

Referring now more particularly to the drawings, a housing 10 is shown which includes a back housing plate 11, vertically disposed, and having hingedly secured thereto at each side edge thereof side doors 12. The doors 12 can, if desired, be provided with ventilating louvers 13 for preventing the accumulation of heated air in the interior of the housing 10.

A vertical front housing wall 14 is provided having a horizontally rearwardly extending upper flange 16 and a horizontally rearwardly extending lower flange 17 which are connected to horizontal flanges 18 and 19, at the top and bottom of the rear wall 11. Each of the wide walls 12 is preferably provided with a source of illumination, and for this purpose a fluorescent tube 20 mounted in upper and lower sockets 21 and 22 can be employed, provided in a conventional manner with a suitable ballast 23 supported on the rear wall 11, and starter 24. The fluorescent tubes 20 are energized from any suitable source of electrical energy (not shown), through a terminal block 25.

The front housing plate 14 is preferably provided with a plurality of vertical slots 26, and rearwardly disposed with respect thereto, and carried by the front wall 14, a transparent plate 27 of synthetic plastic or other suitable material is provided. The plate 27 is preferably sand blasted on one face, to diffuse the light from the fluorescent tubes 20 passing through the plate 27 and through the slots 26.

Secured to the front plate 14, upper and lower horizontal brackets 30 and 31 are provided, preferably of non-electrical conductive materials.

Each of the brackets 30 and 31 preferably includes an inner plate 32 secured to the housing plate 14 in any suitable manner such as by studs 33.

Each of the brackets 30 and 31 also preferably includes an outer plate 34 which is secured in aligned relation to the inner plate 32 by a stud 35 extending outwardly therethrough and having a wing nut 36 on the outer end for permitting the removal of the outer plate 34, as desired.

The bracket plates 32 and 34 preferably have bores 37 extending therethrough of predetermined diameter, and additional bores 38 extending downwardly in the bottom bracket plates 32 and 34 and upwardly in the upper bracket plates 32 and 34.

Within the bores 37, vertically extending measuring tubes 40 are provided, of transparent material and preferably of transparent heat resistant glass, and of an outside diameter corresponding to the diameter of the bores 37.

The tubes 40 are provided over the portions of the lengths thereof to be utilized for measurement, with suitable indicia which may be in the form of etched graduations 41 on a transparent strip 42 of colored material of the same composition as the tubes 40, the strip 42 being applied in the course of manufacture of the tubes 40 and the graduations 41 being subsequently applied thereon.

Each of the tubes 40 is provided, on the exterior thereof, with a transparent electro-conductive coating 43 over the entire periphery of the tube 40 and extending a length greater than the distance between the termini of the bores 38 in the upper and lower bracket plates 32 and 34.

While the character of the coating 43 can be varied, as desired, it is preferably such as to accommodate a current density of the order of 1 to 2 watts per square inch, and is preferably applied after the graduations 41 have been applied to the tubes 40.

Surrounding each of the tubes 40 and in contact with the exterior coatings 43 thereon, an additional tube 44 of transparent material is provided, preferably of heat resistant glass, to permit of easy visual observation of the graduations 41 but to prevent manual access to the conductive coating 43.

Each of the bracket plates 32 is provided with contacts 45 for supplying the desired electrical energy to the electroconductive coating 43. These contacts 45 preferably each comprise contact fingers 46 with their inner end faces urged into engagement with the conductive coating 43 by springs 47, the contact fingers 46 and springs 47 being retained within brush holders 48 mounted in the bracket plates 32. The brush holders 48 have suitable insulated conductors 49 extending thereto for supplying electrical energy at the desired potential from any suitable source (not shown).

While the tubes 40 may, if desired, be open at the top for access to the interior thereof, if a control of the pressure conditions therein is desired, the upper ends of the tubes 40 can have suitable conduits 50 extending therefrom with valves 51 therein, the conduits 50 being connected, as desired, to a source of liquid and/or to a source of pressure or to a source of vacuum.

The lower ends of the tubes 40 preferably also have connectors 52 connected thereto with valves 53 therein for retaining fluent material within the tubes 40, for regulating the discharge therefrom over a predetermined timed interval, or for other purposes.

The mode of operation will now be pointed out.

With the fluorescent tubes 20 in energized condition, light is supplied through the plate 27 and the slits 26 for illuminating the outer tubes 44 and the inner tubes 40 so that the graduations 41 may be easily observed. The desired potential is applied to the conductors 49 between the upper and lower brush holders 48 to provide a controlled heating action for heating the contents of the tubes 40 to the desired predetermined temperature level. For some purposes, a selected temperature level in the range from 200° F. to 300° F. will be utilized.

With liquids, and particularly liquids of high viscosity, or even with materials which are solid at normal room temperatures, the heating effect on the material in the tubes 40, by reason of the heating action applied from the conductive coatings 43, will render the materials of suitable viscosity for observation and measurement. At the same time, the outer tube 44 prevents contact by the user with the electroconductive coating 43, thereby avoiding electrical shock to the user, protects the user from injury due to the heat applied, and prevents accidental injury to the graduated tube 40.

If the instrument is employed as a sight glass, the upper and lower ends of the tubes 40 will, of course, be connected by the connectors 50 and 52 to the vessels having levels to be determined and measured.

For other uses, after the material has been introduced into one or both of the tubes 40 in any desired manner, and the temperature brought to the desired level by the heating action of the coating, the lower valves 53 can then be opened to permit the delivery, at a predetermined rate, so that the drop in level over a timed interval can be determined.

If the measuring tubes 40 are intended to be employed for a float-type flow meter, then the interior of the tube 40 can have a tapered bore in the manner commonly employed with that type of instrument.

For use as a burette, the upper connections 50 can be omitted or removed.

The desired pressure conditions, either as to pressure or vacuum, can be provided above the liquid in the tubes 40 by pressure or vacuum application through the connections 50.

The calibrations 41 on the tubes 40 can, of course, be provided to accommodate the particular character of use of the instrument.

We claim:

1. A burette comprising a housing having a vertical front wall, vertically spaced supports extending outwardly from said front wall, a vertical transparent tube mounted in said supports for containing fluid, said tube extending upwardly and downwardly beyond said supports, a valve member at the lower end of said tube and controlling the discharge of fluid therefrom, said tube having calibrating indicia therealong between said supports, a transparent electroconductive coating on the exterior of said tube and covering said tube over the exposed portion thereof between said supports for heating the contents of the tube, electrical contacts carried by each of said supports in spaced relation along said tube and engaging said coating at spaced locations along said tube for energizing said coating, and a second transparent glass tube surrounding said first tube in the space between said supports and having its upper and lower ends in abutting relation to facing portions of said supports.

2. A burette as defined in claim 1 in which said front wall has a vertical slot between said supports and illuminating means is provided for said tube carried by said housing and rearwardly disposed with respect to said front wall and said slot.

3. A burette comprising a housing having a vertical front wall, an upper supporting bracket extending outwardly from said front wall and having a vertical opening therethrough, a lower supporting bracket spaced below said upper bracket extending outwardly from said wall and having a vertical opening aligned with said first mentioned vertical opening, a vertical transparent tube held in gripped relation in said bracket openings for containing fluid, said tube extending upwardly and downwardly beyond said brackets and having calibrating indicia therealong between said brackets, a valve member at the lower end of said tube for controlling the discharge of fluid therefrom, a transparent electroconductive coating on the exterior of said tube and extending between said brackets for uniformly heating the contents of said tube, an electrical contact mounted in each of said brackets, said contacts engaging said coating at spaced intervals along said tube for energizing said coating, and a second transparent glass tube surrounding said first tube and extending between said supports with its upper and lower ends in abutting relation to facing portions of said supports.

References Cited in the file of this patent

UNITED STATES PATENTS

| | | |
|---|---|---|
| 320,749 | Beilby | June 23, 1885 |
| 1,006,105 | Leonhardt | Oct. 17, 1911 |
| 1,759,767 | Thomson | May 20, 1930 |
| 2,332,088 | Kelly | Oct. 19, 1943 |
| 2,503,033 | Englemann | Apr. 4, 1950 |
| 2,533,490 | McGrath | Dec. 12, 1950 |
| 2,761,945 | Colbert et al. | Sept. 4, 1956 |
| 2,777,044 | Lytle | Jan. 8, 1957 |

FOREIGN PATENTS

| | | |
|---|---|---|
| 156,446 | Great Britain | Jan. 13, 1921 |